United States Patent [19]

Hohnerlein

[11] Patent Number: 5,024,856
[45] Date of Patent: Jun. 18, 1991

[54] METHOD AND APPARATUS FOR APPLYING A FLUX

[76] Inventor: Ernst Hohnerlein, Ringstrasse 7, 6983 Kreuzwertheim, Fed. Rep. of Germany

[21] Appl. No.: 456,575

[22] Filed: Dec. 29, 1989

Related U.S. Application Data

[63] Continuation of Ser. No. 265,233, Oct. 31, 1988, abandoned.

[30] Foreign Application Priority Data

Mar. 18, 1988 [DE] Fed. Rep. of Germany ....... 3809156

[51] Int. Cl.$^5$ ................................................. B05B 3/12
[52] U.S. Cl. ..................................... 427/57; 427/256; 427/424; 118/50.1; 118/323
[58] Field of Search ............. 118/50.1, 323, 602, 118/694, 323; 239/101, 4, 290, 135; 427/57, 256, 424

[56] References Cited

U.S. PATENT DOCUMENTS

| 1,861,475 | 6/1932 | Hopkins et al. | 118/300 |
| 2,763,575 | 9/1956 | Bede | 118/602 |
| 3,195,501 | 7/1965 | Barkhau | 118/323 |
| 3,365,326 | 1/1968 | Conrad | 118/694 |
| 3,605,682 | 9/1971 | Groce et al. | 118/694 |
| 4,218,533 | 8/1980 | Fuchigami et al. | 427/57 X |
| 4,564,410 | 1/1986 | Clitheros et al. | 118/323 |

FOREIGN PATENT DOCUMENTS

| 0118091 | 9/1984 | European Pat. Off. |
| 2916977 | 4/1979 | Fed. Rep. of Germany |
| 2916977 | 11/1980 | Fed. Rep. of Germany |

Primary Examiner—Richard Bueker
Assistant Examiner—George A. Goudreau
Attorney, Agent, or Firm—W. G. Fasse; D. H. Kane, Jr.

[57] ABSTRACT

A method and an apparatus enable the application of a flux material onto a geometrically defined joint to be soldered.

The flux material is first ultrasonically atomized in a pressureless or almost pressureless manner. Thereafter, the flux material mist is transported and applied to the joint to be soldered by a directed air stream.

9 Claims, 1 Drawing Sheet

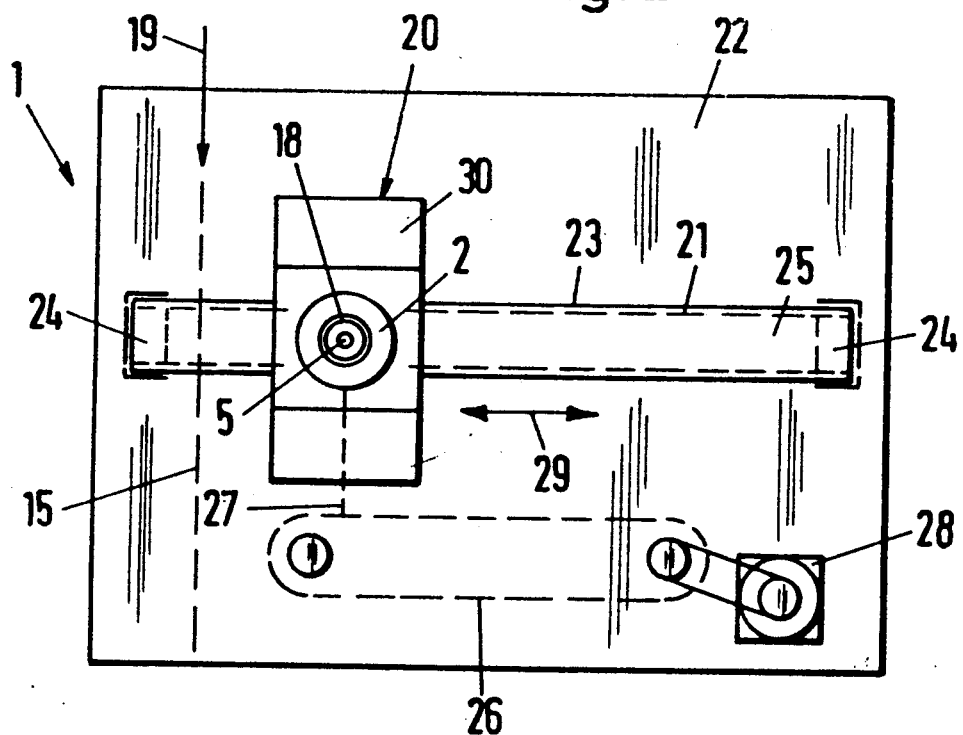
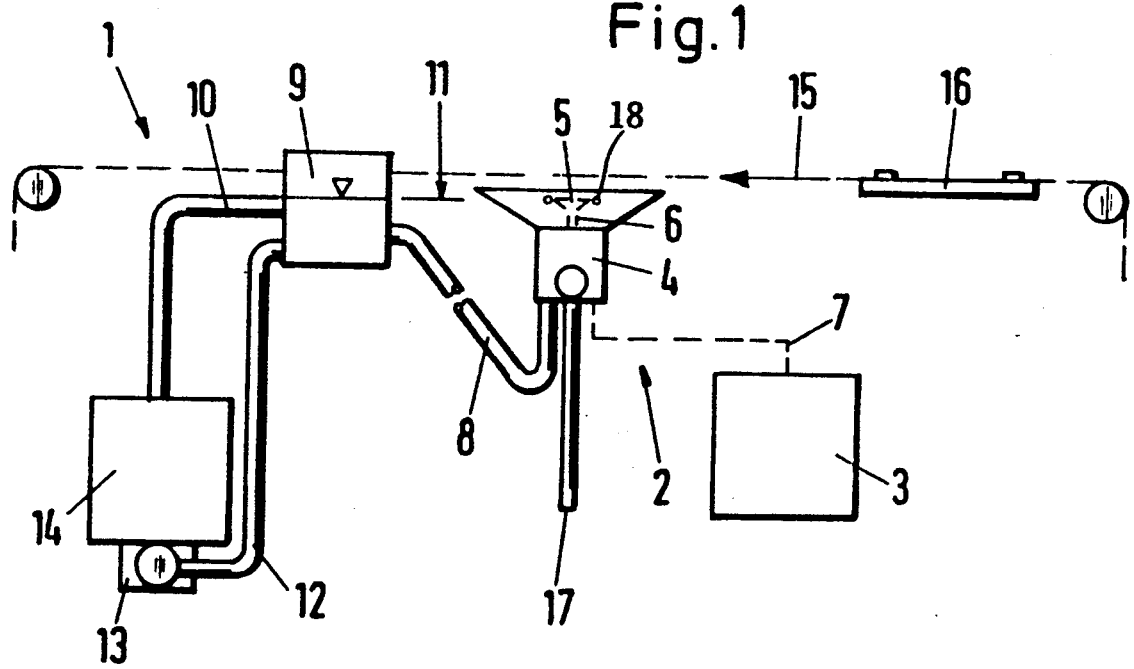

METHOD AND APPARATUS FOR APPLYING A FLUX

This application is a Continuation of application Ser. No. 07/265,233, filed Oct. 31, 1988, now abandoned.

FIELD OF THE INVENTION

The invention relates to a soldering method and an apparatus for applying flux materials onto a geometrically defined joint to be soldered.

BACKGROUND INFORMATION

Methods and apparatus for applying flux materials are known in large numbers. In that context, spray methods and spray apparatus are also included which allow a small flux material application and cause essentially no capillary effect, especially for endangered components such as open relay contacts, etc.

It is a disadvantage of known flux material spray methods and apparatus that the flux material cannot be applied in a directed or geometrically defined and limited manner. Generally, components or defined surfaces must be masked due to the arising vapors which in its result, is very costly. Normally, the areas surrounding the surfaces to be sprayed, and the parts located thereon, are considerably fouled even with costly masking measures.

OBJECTS OF THE INVENTION

It is therefore the object of the invention to provide a method and an apparatus for applying a soldering flux onto a geometrically exactly defined small area point forming a joint to be soldered, whereby a quantity as uniform as possible is to be applied in the spacially defined region.

SUMMARY OF THE INVENTION

The foregoing object has been achieved according to the invention provides in that the flux material is first ultrasonically atomized in a pressureless or almost pressureless manner and that then the flux material mist is transported to the joint to be soldered and is applied to the joint by means of a directed airstream.

The pressureless or almost pressureless ultrasonic atomization of the flux material permits generating a flux material mist substantially without any air turbulence. It is formed directly in the area of the atomizer element. The directed airstream then serves to apply the flux substance in the flux material mist onto the joint to be soldered, whereby the directed airstream transports the flux material mist from the atomizer element to the joint to be soldered for achieving the desired deposition, without soiling areas outside the joint to be soldered.

Especially flux materials with a very low solid content, such as on the order of magnitude of 1%, are very well suited for an ultrasonic atomization and in many cases are completely sufficient for the soldering.

BRIEF DESCRIPTION OF THE DRAWINGS

The invention will now be described in more detail with reference to an example embodiment shown in the accompanying drawings, wherein:

FIG. 1 shows a principle sketch of the apparatus for applying a flux material with an ultrasonic atomizer; and FIG. 2 shows a schematic top view of the apparatus for ultrasonically atomizing.

DETAILED DESCRIPTION OF PREFERRED EXAMPLE EMBODIMENTS AND OF THE BEST MODE OF THE INVENTION

An apparatus 1 for applying a flux material onto a geometrically defined joint to be soldered, for example, onto a circuit board which is not shown in the figures, comprises an ultrasonic atomizer 2 which includes an oscillator 3, a vibration generator integrated into a housing 4, and an atomizer element 5. The atomizer element 5, is, for example, trumpet-shaped, and comprises a pipe 6 with a conically expanding free end. By means of the oscillator 3 via a connecting conduit 7, the vibration generator in the housing 4 is excited to vibrate or oscillate and to transmit the vibrations to the atomizer element 5, so that the liquid located there is excited into corresponding oscillations and in the case of ultrasonic oscillations, is atomized or misted.

The flux material enters the atomizer element 5 with its trumpet-shaped free end and its inlet pipe 6 through a pipe or hose conduit 8 attached to the housing 4. The other end of the pipe or hose conduit 8 is connected to a supply container 9 for flux material.

The ultrasonic atomization of the flux material at the atomizer element 5 is to be achieved in a manner which is as close to pressure-free as possible. For this reason, the supply container 9 is provided with an overflow 10 which is arranged in such a manner that the liquid level 11 of the flux material in the supply container 9 is located at the same level or almost the same level as the trumpet-shaped opening of the atomizer element 5. According to the principle of communicating pipes, flux material then flows out of the supply container 9 through the conduit 8 and a connecting conduit located in the housing 4 into the pipe-shaped atomizer element 5 and is then available without pressure at the trumpet-shaped end of the atomizer element 5.

The supply container 9 is further connected by another conduit 12 to a pump 13 which sucks flux material from a second supply container 14 and pumps it into the supply container 9. The overflow 10 is connected to the second supply container 14 so that the pump 13 can pump flux material in a closed circuit loop through the conduit 12 to the supply container 9, whereby simultaneously the unneeded excess flows back to the supply container 14 and thus to the pump 13 while maintaining a constant liquid level in the container 9.

Further, FIG. 1 shows schematically with dashed lines a transport arrangement 15 for a work piece carrier 16. The transport arrangement 15 is located over or above the ultrasonic atomizer 2 of which the atomizer element 5 is directed upwardly with its trumpet-shaped opening. In order to apply flux material onto a work piece secured to the work piece carrier 16, but not shown in FIG. 1, the work piece carrier 16 is moved over the ultrasonic atomizer 2 and remains in this position until the flux material application has been achieved. Since only a flux material mist is formed at the trumpet-shaped opening of the atomizer element 5 during the ultrasonic atomization, the actual transport and application of the flux material onto the work piece is finally achieved by means of an airstream which entrains the flux material mist in the area of the trumpet-shaped opening of the atomizer element 5 and blows it to the work piece. In order to produce this airstream, an air pressure conduit 17 leads to the housing 4 of the ultrasonic atomizer 2 and is connected to a nozzle arrangement or an annular nozzle 18 (FIG. 2) which concentrically surrounds the atomizer element 5. The annular nozzle 18 forms a hollow cross-section airstream which surrounds a flux mist cloud formed by said atomizer element 5. The hollow constant airstream carries the flux mist cloud to a small area point to be soldered.

It is to be understood that the supply container 9 is arranged laterally next to the transport arrangement 15 so that it does not interfere with the latter. The conduit 8 leading from the supply container 9 to the housing 4 of the ultrasonic atomizer 2 is furthermore as flexible as possible so that the ultrasonic atomizer 2 is not only usable in a stationary position, but rather may itself be also movably supported and is movable relative to the transport arrangement 15, preferably perpendicularly to the motion direction of the latter.

Such an arrangement with an ultrasonic atomizer 2 which itself is movable perpendicularly to the motion direction 19 of a transport arrangement 15, is also shown by dashed lines in FIG. 2. Here, the ultrasonic atomizer 2 together with a blower arrangement including the annular nozzle 18 and a pressurized air supply or pressurized air conduit 17 are arranged on a slide-type carrier 20 and movable with the carrier 20 perpendicularly to the motion direction 19 of the transport arrangement 15 for the work pieces supported on the carrier 16. Details of the slide-type carrier 20 are not shown in the figures, however, it reaches through an elongated hole 21 in a floor plate 22 and is integrated into a sealing band 23 which covers the elongated hole 21. The sealing band 23 is made of an upper strand or run and a lower strand or run and is guided around idler rollers 24. The upper strand 25 lies on the top surface of the floor plate 22 and covers with its edges the elongated hole 21 in the floor plate 22.

A circulatingly running belt drive 26 arranged parallel to the sealing band 23 with an engaging catch 27 which directly engages the slide-type carrier 20, is provided as a drive for the slidetype carrier 20. A motor 28 serves for controlling the belt drive 26 in the respectively desired motion direction corresponding to the arrow 29. The two direction reversal points may be adjustable in a known manner so that the working width of the ultrasonic atomizer 2 moving back and forth in the crosswise direction may be adapted to the width of the work piece to be provided with a flux material application, for example, a backside of a circuit board to be soldered and may be oriented relative to the transport arrangement 15 for the work piece moving continuously forward.

Finally, a droplet collection tub 30 is provided for the ultrasonic atomizer 2 in the arrangement shown in FIG. 2. It is also attached to the carrier 20 and surrounds the atomizer element 5.

Although the invention has been described with reference to specific example embodiments it will be appreciated that it is intended to cover all modifications and equivalents within the scope of the appended claims.

What I claim is:

1. In a soldering method requiring applying a flux material to a small area point forming a joint to be soldered on an electrical component, the improvement comprising the following steps:
   (a) transporting said electrical component in a given transport direction,
   (b) ultrasonically atomizing said flux material in an ultrasonic atomizer (3, 5) in a substantially pressureless manner to provide a pressureless flux mist substantially without air turbulence,
   (c) separately generating around said flux mist an airstream of hollow constant cross-section by an air nozzle (18) independently of said atomizing of said flux materials,
   (d) moving said ultrasonic atomizer (3, 5) and said air nozzle (18) in a direction substantially perpendicular to said given transport direction, and
   (e) entraining and carrying said pressureless flux mist inside said hollow constant cross-section airstream for supplying said pressureless flux mist to any small area point forming a joint to be soldered on said electrical component by directing said hollow constant cross-section airstream onto said small area point forming a joint to be soldered without substantial mixing between said flux mist and said airstream to avoid fouling said electrical component with flux even without masking.

2. The method according to claim 1, wherein said step (e) is performed by directing said flux material mist in an upward direction to said joint to be soldered by means of pressurized air.

3. An apparatus for applying flux to a small area point forming a joint to be soldered on an electrical component, comprising means (15) for transporting said electrical component in a given transport direction (19), ultrasonic atomizer means (3, 5) including an atomizing element (5) for producing a pressureless flux mist in a substantially pressureless manner and substantially without air turbulence, means (8, 9, 10) for delivering flux material in a pressureless manner to said ultrasonic atomizer means, ring nozzle means (18) surrounding said atomizing element (5), said ring nozzle means (18) including a blower device for separately generating a hollow cross-section airstream of uniform diameter independtly of said atomizer means to surround said flux mist with said hollow cross-section airstream for entraining and carrying said pressureless flux mist from said atomizer means to said small area point, and means for moving said atomizer means and said ring nozzle means in a direction substantially perpendicularly to said given transport direction for locating said ring nozzle means (18) into a position for carrying said flux mist with said hollow cross-section airstream to any small area point forming a joint to be soldered, to avoid fouling said electrical component with flux even without masking.

4. The apparatus according to claim 3, wherein said means for moving comprise a carrier (20), and wherein said ultrasonic atomizer means, said nozzle means and said blower device (17, 18) are arranged on said carrier (20), and drive means (26, 28) connect to said carrier for moving said carrier substantially perpendicularly to said transport direction (19) of said electrical component.

5. The apparatus according to claim 4, further comprising a floor plate (22), said carrier (20) with said ultrasonic atomizer means means and with said blower device (17, 18) being arranged below said floor plate (22), said floor plate (22) comprising an elongated hole (21) extending perpendicularly to said work piece transport directing (19), said apparatus further comprising a movable sealing band (23) covering said elongated hole (21), and wherein said carrier (20) with said ultrasonic atomizer means (2) and with said blower device is connected to said sealing band (23).

6. The apparatus according to claim 3, further comprising a droplet collecting tub (30) arranged for receiving flux droplets from said atomizing element (5) of said ultrasonic atomizer means (2).

7. The apparatus according to claim 3, wherein said means for delivering flux comprise a supply container (9) for said flux, said supply container having an overflow (10) with an elevation substantially at a level of said atomizing element (5) and a flux delivery conduit (8) connecting said supply container (9) to said atomizing element.

8. The apparatus according to claim 3, wherein said atomizing element (5) forms substantially a column cloud of flux mist and wherein said annular ring nozzle (18) concentrically surrounds said atomizing element (5) to form a tubular hollow airstream around said flux mist column cloud for carrying flux mist produced by said atomizing element (5) to said joint to be soldered.

9. In a soldering method requiring applying a flux material to a small area point forming a joint to be soldered on an electrical component, the improvement comprising the following steps:
 (a) ultrasonically atomizing said flux material in an ultrasonic atomizer (3, 5) in a substantially pressureless manner to produce a pressureless flux mist substantially without air turbulence;
 (b) separately generating around said flux mist an airstream of hollow constant cross-section by an air nozzle (18) independently of said atomizing of said flux material, and
 (c) entraining and carrying said pressureless flux mist in and with said hollow constant cross-section airstream to any small area point forming a joint to be soldered on said electrical component by directing said hollow constant cross-section airstream onto said small area point forming a joint to be soldered without substantial mixing between said pressureless flux mist and said airstream, to avoid fouling said electrical component with flux even without masking.

* * * * *

UNITED STATES PATENT AND TRADEMARK OFFICE
CERTIFICATE OF CORRECTION

PATENT NO. : 5,024,856
DATED      : June 18, 1991
INVENTOR(S) : Ernst Hohnerlein It is certified that error appears in the above-identified patent and that said Letters Patent is hereby corrected as shown below:

Claim 3, column 4, line 37, replace "independtly" by
                                     --independently--.

Claim 4, Column 4, line 53, replace "connect" by --connected--.

Claim 5, Column 4, line 58, delete "means" (second occurrence);
                   line 62, replace "directing" by
                            --direction--;
                   line 65, replace "con-" by --in--;
                   line 66, replace "nected to said" by
                            --contact with said--.

Signed and Sealed this

Twenty-fourth Day of November, 1992

Attest:

DOUGLAS B. COMER

Attesting Officer

Acting Commissioner of Patents and Trademarks